US008020475B2

(12) United States Patent
Schneider et al.

(10) Patent No.: US 8,020,475 B2
(45) Date of Patent: Sep. 20, 2011

(54) METHOD OF SIMULTANEOUS SINGULATION AND EDGE SEALING OF PLASTIC DISPLAYS

(75) Inventors: Tod Schneider, Kent, OH (US); Sean Franklin, Kent, OH (US); Nithya Venkataraman, Wooster, OH (US); Donald Davis, Conneaut Lake, PA (US)

(73) Assignee: Kent Displays Incorporated, Kent, OH (US)

( * ) Notice: Subject to any disclaimer, the term of this patent is extended or adjusted under 35 U.S.C. 154(b) by 461 days.

(21) Appl. No.: 11/756,987

(22) Filed: Jun. 1, 2007

(65) Prior Publication Data

US 2007/0277659 A1 Dec. 6, 2007

Related U.S. Application Data

(60) Provisional application No. 60/803,768, filed on Jun. 2, 2006.

(51) Int. Cl.
*B26D 5/00* (2006.01)
*B26D 1/56* (2006.01)
*B26D 7/06* (2006.01)
*B29C 65/00* (2006.01)
*B65C 9/25* (2006.01)

(52) U.S. Cl. .............. 83/73; 156/60; 156/250; 156/251; 156/253; 156/324; 83/284; 83/401

(58) Field of Classification Search ........ 83/73; 349/73; 156/251
See application file for complete search history.

(56) References Cited

U.S. PATENT DOCUMENTS

| | | | |
|---|---|---|---|
| 4,069,080 A | 1/1978 | Osborne | |
| 4,224,096 A | 9/1980 | Osborne | |
| 5,008,049 A | 4/1991 | Rose et al. | |
| 5,365,034 A * | 11/1994 | Kawamura et al. | 219/121.83 |
| 6,369,867 B1 * | 4/2002 | Ge | 349/73 |
| 6,392,785 B1 | 5/2002 | Albert et al. | |
| 6,473,072 B1 | 10/2002 | Comiskey et al. | |
| 6,655,788 B1 | 12/2003 | Freeman | |
| 6,723,479 B2 | 4/2004 | Van De Witte et al. | |
| 6,738,050 B2 | 5/2004 | Comiskey et al. | |
| 6,777,249 B2 * | 8/2004 | Yamazaki | 438/4 |
| 6,788,452 B2 | 9/2004 | Liang et al. | |
| 6,795,138 B2 | 9/2004 | Liang et al. | |
| 6,816,226 B2 | 11/2004 | Bouten | |
| 2002/0118321 A1 | 8/2002 | Ge | |
| 2002/0118335 A1 * | 8/2002 | Tannas, Jr. | 349/187 |
| 2003/0184706 A1 * | 10/2003 | Watson | 349/187 |
| 2004/0233379 A1 | 11/2004 | Kinoshita et al. | |

(Continued)

OTHER PUBLICATIONS

Feringa et al., "Chiroptical molecular switches," Chemical Reviews 2000, vol. 100, No. 5, Aug. 11, 1999, pp. 1789-1816.

(Continued)

*Primary Examiner* — Philip Tucker
*Assistant Examiner* — Alex Efta
(74) *Attorney, Agent, or Firm* — Pearne & Gordon LLP

(57) ABSTRACT

The production of liquid crystal displays (LCDS) on plastic substrates is desirable over glass substrates so that the finished product is thinner, lighter, and more robust. Plastic substrates can enable the use of new and different processing techniques which are not possible on glass such as roll-to-roll processing. This invention discusses an advancement which is laser cutting a plastic substrate and display layer. One aspect of the invention is laser cutting and welding together two or more plastic substrates and LCD layer therebetween from a larger sheet or roll of plastic LCDs.

27 Claims, 2 Drawing Sheets

U.S. PATENT DOCUMENTS

| | | | |
|---|---|---|---|
| 2005/0196524 A1 | 9/2005 | Jacobsen et al. | |
| 2005/0264748 A1* | 12/2005 | Imayama et al. | 349/153 |
| 2006/0066803 A1* | 3/2006 | Aylward et al. | 349/158 |
| 2006/0160259 A1* | 7/2006 | Chiang et al. | 438/26 |
| 2006/0286309 A1* | 12/2006 | Chari et al. | 428/1.1 |

OTHER PUBLICATIONS van de Witte et al., "Modification of the twist angle in chiral nematic polymer films by photoisomerization of the chiral dopant," Journal of Applied Physics, vol. 85, No. 11, Jun. 1, 1999, pp. 7517-7521.

Ikeda, "Photomodulation of liquid crystal orientations for photonic applications," Journal of Materials Chemistry, 2003, 13, pp. 2037-2057.

Pieraccini et al., "A new axially-chiral photochemical switch," Chem. Commun., 2003, pp. 598-599.

Yoshida et al., "Reflective display with photoconductive layer and bistable reflective cholesteric mixture," Journal of the SID, May 3, 1997, pp. 269-274.

* cited by examiner

METHOD OF SIMULTANEOUS SINGULATION AND EDGE SEALING OF PLASTIC DISPLAYS

CROSS-REFERENCE TO RELATED APPLICATION

This application claims the benefit of U.S. Provisional Patent Application No. 60/803,768 filed Jun. 2, 2006, which is incorporated herein by reference in its entirety.

BACKGROUND OF THE INVENTION

Most liquid crystal displays (LCDs) are made from a sandwich of liquid crystal (LC) between two glass substrates coated with a transparent conductor. The glass substrates are generally held together to a predetermined gap using an epoxy-based gasket at the edge. For glass LCDs, two big challenges remain; namely, flexibility and durability. These problems can be addressed by using plastic substrates. However, the need remains for an effective edge seal to prevent the two plastic substrates from delaminating.

One advantage in using plastic to make LCDs is to make the display in a roll-to-roll process. For roll-to-roll processing to be effective, the liquid crystal material should be filled between two spaced substrates and prevented from flowing by an encapsulation process. Liquid crystal can be encapsulated using microcups (or well-defined polymer walls), emulsification, Thermally Induced Phase Separation (TIPS), Solvent Induced Phase Separation (SIPS), or Polymerization Induced Phase Separation (PIPS). With PIPS, for example, the droplets of liquid crystal are excluded from the bulk via phase separation. As polymeric chains grow in molecular weight the liquid crystal becomes encapsulated into micron-sized droplets by solid polymer walls. Once encapsulated, the liquid crystal cannot flow between the substrates or leak out if the substrates are cut. Oftentimes the polymer walls created during the encapsulation process are not very strong since they can have a width on the scale of micron to sub-micron. Due to the thin polymer walls and the fact that there is very little solid material to hold the substrates together, delamination of the two bounding substrates is very easy to nucleate at the edges of the LCD. Therefore, an edge seal mechanism is required to prevent delamination.

An LCD can be edge sealed in a number of ways. As mentioned above, one may use an internal gasket (e.g., composed of epoxy or photo-resin), an adhesive tape, or an external gasket such as silicone. The internal gasket is very effective for edge sealing and is the dominant technology used in the LCD industry because of a strong bond between the substrates and low gas (moisture) permeability. However, it is best suited to a batch process, as roll-to-roll manufacturing a gasket seal is technologically challenging in that both the LC and the resin seal must be applied (as liquids) simultaneously. External adhesive tape forms a weaker bond, is less mechanically robust and is generally quite permeable and susceptible to water-damage. An external gasket such as silicone is an effective moisture barrier as it has low gas permeability. However, it is not very mechanically robust, as it tears easily. In the case of external edge seals such as adhesive tape and external gaskets, one must first make the display on a roll, singulate (or cut) the display, and then apply the edge seal.

It is well known that infrared lasers can cut and weld plastic materials (U.S. Pat. Nos. 4,069,080 and 4,224,096). Laser welding two thermoplastic substrates together requires that the two plastic pieces absorb infra-red light, heat-up, and flow together to create a strong bond. A limitation of conventional laser welding is the understanding that only pure thermoplastic materials in contact with one another can be laser welded because impurities in the area to be bonded can contaminate the bond and cause its failure.

This disclosure enables using lasers to cut and weld substrates in the formation of displays even in the presence of liquid crystal or other materials as impurities.

DISCLOSURE OF THE INVENTION

The present invention features a method of fabricating a display. A layer of display media and at least one layer of thermoplastic polymer are stacked. The layers are cut using a laser beam, comprising continuously moving the laser beam between a first direction along the stack and a second direction transverse to the first direction, thereby forming a cut pattern. The laser beam typically impinges orthogonally between the top and bottom surfaces of the stack.

The display media is selected from the group consisting of liquid crystal material, electrophoretic material, microcups containing liquid crystal material, microcups containing electrophoretic material, twisted nematic liquid crystal material, and super twisted nematic liquid crystal material. Cholesteric liquid crystal material is preferred. The liquid crystal material can include droplets of material dispersed in a polymer matrix. In most cases the display will include two layers of electrically conductive material flanking the display layer, which enables the display media to be electrically addressed so as to produce images on the display.

In one embodiment, the display includes at least two of the polymer layers (e.g., at least one of which can be transparent and at least one of which can be a substrate). The display layer is disposed between the polymer layers, and the polymer layers are cut and welded together in forming the cut pattern. This embodiment includes a display having only a single substrate made of thermoplastic polymer with an outer protective polymer layer, and the display layer sandwiched therebetween. The display is viewed through the upper transparent polymer layer.

In another embodiment the display includes two of the polymer layers (e.g., two polymer layer substrates, at least one of which is transparent). The display layer is disposed between the substrates and the substrates are cut and welded together in forming the cut pattern. The display is viewed through the upper transparent polymer substrate.

The display can be electrically addressed using a passive or an active matrix. In the case of passive matrix, the first electrically conductive layer comprises a plurality of first electrode lines and the second electrically conductive layer includes a plurality of second electrode lines extending orthogonal to the first electrode lines. In the case of active matrix, the polymer layer and the first electrically conductive layer comprise an active matrix backplane. The active matrix may employ a plurality of thin film transistors as known in the art.

Referring now to specific aspects of the present invention, the cut pattern has a shape selected from the group consisting of sinusoidal, saw-tooth, square wave or combinations thereof. For example, the cut pattern has an amplitude in the second direction that ranges from 20 to 500 micrometers and a period in the first direction that ranges from 50 to 1000 micrometers. It may be possible for the display to be additionally cut in a way that does not include the cut pattern. The layers can be cut by moving the laser in the first direction without movement in the second direction (e.g., in a straight line).

Suitable thermoplastic polymer for the substrates and polymer protective layers is selected from the group consisting of: polycarbonate (PC), polyethylene terephthalate (PET), PC/PET blends, polyethylene naphthalate (PEN), polyester, polyvinyl chloride, polypropylene cellulose acetate, ethylene-vinyl acetate, triacetyl cellulose (TAC), polybutylene terephthalate, polytetrafluoroethylene, polyvinyl fluoride, polyvinylidene fluoride, perfluoroalkoxy tetrafluoroethylene, polychloro trifluoroethylene, polyamides, polyimides, polyamideimide, polyetherimides, polyoxymethylene, polyphenylene oxide, polyaryletherketones, polysulphones, polyphenylene sulfide and combinations thereof.

The electrically conductive layers can comprise indium tin oxide or indium zinc oxide. Advantageous material for the electrically conductive layer includes carbon nanotubes or conductive polymer.

In the event there is an electrical short that occurs during display fabrication, the electrical short can by removed by tracing the cut pattern with a laser and burning it away. Alternatively, the electrical short can be burnt away with electronic switching of the display.

The present invention adapts the proven technologies of laser cutting and laser welding plastic substrates to edge sealing of LCDs. In our approach, the LCDs are simultaneously singulated from a roll or sheet and edge-sealed via laser welding in one step.

Stacked layers of polymer substrate, liquid crystal material and electrically conductive material are cut along a line around the perimeter of the electrooptical cell or liquid crystal display. The laser is moved along the cut/weld-line and transverse (e.g., perpendicular) to the cut/weld-line, which dramatically improves the strength of the laser weld. Examples of cut lines made by such laser movement are sinusoidal, saw tooth, and square cut lines (FIG. 1). Even in the presence of liquid crystal material, the laser is able to both cut and weld the layers (e.g., thermoplastic polymer) of the display together in a continuous manner. By propagating the laser continuously along and transverse to the cut/weld-line (e.g., in a sinusoidal motion), the path length is increased thereby increasing the strength of the weld. Due to the geometry of the sinusoidal cut line, a portion of the cut/weld line is always oriented perpendicular to forces propagated in various directions, which enables the LCD to avoid delamination.

The inventive laser seal method is readily applicable to technologies besides cholesteric liquid crystal displays, for example, conventional plastic LCDs, microcups and electrophoretic technologies.

Plastic LCDs can be made by sandwiching liquid crystal between two plastic substrates that can be spaced by glass or polymeric spacers, polymeric ribs or polymeric posts and sealing by a gasket at the edges as disclosed in the following patents, which are incorporated herein by reference in their entireties: U.S. Pat. Nos. 6,655,788; 6,788,452; 6,795,138; 6,392,785; 6,473,072; 6,738,050. Preferably, these spacing materials would be thermoplastic materials such as polyimide that would melt and bond the top and bottom substrates together at the laser edge seal. However, non-thermoplastic materials such as glass spacers may also be suitable provided care is taken to pattern the spacers up to but not within the laser edge seal. Regardless, the substrates should be of a suitable thermoplastic material that can be melted together at the edges.

Microcup technologies encapsulate an electro-optic material such as a liquid crystal or electrophoretic in a cup that is created at one substrate and sealed when the top substrate is laminated over top as disclosed in the U.S. Pat. Nos. 6,788, 452 and 6,795,138. The top and bottom substrates in the system are generally polymeric, as well as the encapsulating walls. Most examples of this technology have been directly electrically addressed with patterned electrodes on the top and bottom substrates, but active matrix organic and inorganic thin-film transistors (TFT) may also be suitable for use with this technique. So long as care is taken not to laser edge seal through an active electrode or trace, these systems are quite suitable for laser edge sealing and singulation, especially since these displays are made in a continuous roll-to-roll fashion.

Electrophoretic technologies (e.g., the U.S. Pat. Nos. 6,392,785; 6,473,072; and 6,738,050) generally consist of a dispersion of fluid droplets containing oppositely charged black and white particulates in an encapsulating polymer layer. Most electrophoretic displays today are either actively addressed with an active matrix TFT backplane or directly addressed with patterned electrodes (conventionally, they are not believed to be suitable for passive-addressing given their weak threshold voltage response). In the case of the active matrix TFT, the backplane is either composed of an inorganic (amorphous silicon) TFT deposited on a thin stainless steel foil or an organic TFT deposited on plastic such as PEN. Provided the steel foil is thin enough or given the proper laser power, the system may be laser edge sealed. Active matrix backplanes on plastic can be laser edge sealed provided the organic TFT substrate is a suitable thermoplastic.

Cholesteric liquid crystal material possesses unique electro-optical features and offers numerous advantages over other display materials. If cholesteric liquid crystal is used to make the plastic LCD, multiple layers can be stacked to produce more than one reflected color.

Edge sealing [1] is used in a multilayer stacked display to avoid the tendency of individual layers to easily delaminate. The laser-welded edge seal according to the present invention is believed to have practical value in manufacturing, since all layers can be easily made in a roll-to-roll process and the singulation and bonding of all substrates in the display can take place in one step.

An advantage to the laser edge seal according to the invention is that the display may be cut to any polygon or shape that is determined by a simple graphic image drawn using Auto CAD or Corel Draw [15] software. In this way, the singulation and simultaneous edge seal lead to rapid prototyping with little to no retooling. In general, as long as the actively switching conductor is not cut with the laser, no shorting from the top substrate to the bottom substrate will occur. Even if a conductor is shorted at the edge after being laser cut, it is possible to repair the display using a laser to burn out the short (e.g., a Nd:YAG laser in the case of ITO electrodes) or to burn out the short by driving the display with a sufficient current that would be apparent to those of ordinary skill in the art in view of this disclosure. Given the proper cutting conditions and materials, it is also possible to laser cut through the conductor without creating shorts.

Not only can laser welding be used to singulate and seal a single/multilayer display at the edges [1, 9], but it can also be used to reinforce the bonding ledges by welding multiple substrate layers [7], to add stress and strain relief points to the display [3, 4, 12, 13], to reinforce exterior corners by rounding them [2], to add strain relief to an interior corner [5, 6, 10, 11], to bond multiple substrate layers for reinforcement to the inter-pixel area of the display [8], to define an area where the single/multi-layer display should bend [3-8], and to cut out through-holes in the display [14].

More specifically, a first embodiment of the invention features a method of fabricating a display comprising:

stacking a layer of display media and at least one layer of thermoplastic polymer; and cutting the layers using a laser beam by continuously moving the laser beam in a first direction within a plane of the layers and in a second direction transverse to the first direction within the plane, thereby forming a cut pattern. Reference to "within a plane of the layers" in this disclosure, means parallel to or substantially parallel to a plane in which the layers of the display extend.

A second embodiment of the invention features a display comprising:

a stack including a layer of the display media and at least one layer of the thermoplastic polymer; and wherein the stack is cut along the continuous cut pattern that has repeating portions extending in the first direction within a plane of the layers and in the second direction that is transverse to the first direction within the plane.

Referring now to specific aspects of the embodiments of the invention, the cut pattern has a shape selected from the group consisting of sinusoidal, saw-tooth, square wave and combinations thereof. The layers can be further cut in the first direction without movement in the second direction.

The display media can be cholesteric liquid crystal material. Other forms of the display media are selected from the group consisting of liquid crystal material, electrophoretic material, microcups containing liquid crystal material, microcups containing electrophoretic material, twisted nematic liquid crystal material, and super twisted nematic liquid crystal material. The liquid crystal material can include a dispersion of droplets of the liquid crystal material dispersed in a polymer matrix.

First and second electrically conductive layers can be stacked so as to flank the display layer, i.e., one of the electrically conductive layers is disposed on one side of the liquid crystal layer and the other of the electrically conductive layers is disposed on the opposite side of the liquid crystal layer. The polymer layer and the first electrically conductive layer can comprise an active matrix backplane. The first electrically conductive layer can include a plurality of first electrode lines and the second electrically conductive layer can include a plurality of second electrode lines extending orthogonal to the first electrode lines. The electrically conductive layers can comprise indium tin oxide, indium zinc oxide, carbon nanotubes or conductive polymer. An electrical short can be repaired by tracing the cut pattern with a laser and burning away the electrical short. Alternatively, an electrical short can be repaired by burning away the electrical short with electronic switching of the display.

The display can comprise at least two stacked polymer layers. The display layer including cholesteric liquid crystal media is disposed between the polymer layers. The polymer layers can be cut and welded together in forming the cut pattern. The display can comprise a number of the display layers n each comprising the cholesteric liquid crystal material, where n≧2. As another option the display media includes cholesteric liquid crystal material reflective of at least two different colors in the display layer. For example, a single display layer can include a cholesteric liquid crystal dispersion in a single display layer reflective of red, green and blue light.

The thermoplastic polymer includes a polymer selected from the group consisting of: polycarbonate (PC), polyethylene terephthalate (PET), PC/PET blends, polyethylene naphthalate (PEN), polyester, polyvinyl chloride, polypropylene cellulose acetate, ethylene-vinyl acetate, triacetyl cellulose (TAC), polybutylene terephthalate, polytetrafluoroethylene, polyvinyl fluoride, polyvinylidene fluoride, perfluoroalkoxy tetrafluoroethylene, polychloro trifluoroethylene, polyamides, polyimides, polyamideimide, polyetherimides, polyoxymethylene, polyphenylene oxide, polyaryletherketones, polysulphones, polyphenylene sulfide and combinations thereof.

Regarding specific aspects of the cut pattern, the cut pattern can have an amplitude in the second direction that ranges from 20 to 500 micrometers and a period in the first direction that ranges from 50 to 1000 micrometers. The cut pattern can form notches that provide strain relief to the display. The display can include at least two stacked polymer layers, the display layer being disposed between the polymer layers, wherein pixels are formed at regions of intersection of the first electrode lines and the second electrode lines, and the polymer layers are welded together at the cut pattern located between the pixels. The display can include at least two stacked polymer layers, the display layer being disposed between the polymer layers, wherein the polymer layers are welded together at the cut pattern located between adjacent first electrode lines or adjacent second electrode lines (or between other electrical conductors such as between adjacent traces). The cut pattern can form a hole in the polymer layers.

A roll or large sheet can comprise the layers of the display media and thermoplastic polymer. In the case of the roll, the roll is unwound and the step of cutting the layers to form a cut pattern is carried out repeatedly so as to cut a plurality of the displays from the unwound roll. In the case of the large sheet, the step of cutting the layers to form a cut pattern is carried out repeatedly so as to cut a plurality of the displays from the large sheet.

A third embodiment of the present invention features a liquid crystal display comprising:

a dispersion layer comprising droplets of liquid crystal material dispersed in a polymer matrix;

electrically conductive layers flanking the dispersion layer; and thermoplastic polymer layers between which the liquid crystal layer and the electrically conductive layers are disposed;

wherein the polymer layers are cut along a continuous cut pattern that has repeating portions extending in a first direction within a plane of the polymer layers and in a second direction that is transverse to the first direction within the plane.

Any of the specific aspects discussed above in connection with the first and second embodiments are applicable to the third embodiment. Moreover, a perimeter of the polymer layers can be cut in a predetermined shape, e.g., a segmented display whose perimeter is cut into a shape around a group of alphabetical letters (see FIG. 3). The cut pattern can extend through the electrically conductive layers. Sealant can be used between the polymer layers around a periphery of the display.

Many additional features, advantages and a fuller understanding of the invention will be had from the accompanying drawings and the detailed description that follows. It should be understood that the above Disclosure of the Invention describes the invention in broad terms while the following Detailed Description describes the invention more narrowly and presents specific embodiments that should not be construed as necessary limitations of the invention as broadly defined in the claims.

DETAILED DESCRIPTION OF THE INVENTION

Figure 1:
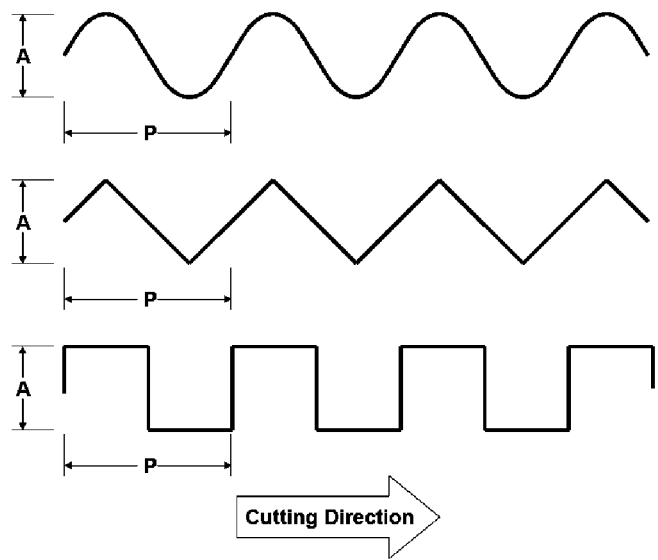
FIG. 1: Example of laser cutting and welding patterns for edge sealing.

The inventive method uses specific cutting paths and power settings so that two or more plastic substrates in a plastic LCD are simultaneously cut and welded together resulting in a strong bond between the plastic substrates even in the presence of a contaminate between the substrates being welded (e.g., liquid crystal as a "contaminant" to the singulation or welding). For plastic LCDs, a robust edge seal prevents substrate delamination at the edge upon bending the substrate. To reinforce the edge seal, the cutting path is elongated by using a path with a cutting motion transverse (e.g., perpendicular) to the direction of cutting. Examples of such transverse cutting motion are saw tooth, square wave or sinusoid (FIG. 1).

The inventive process can use, for example, a model M-300 laser marking system built by Universal Laser Systems, Inc (Scottsdale, Ariz.) developed for moderate to high-speed, low power engraving and cutting operations. This unit consists of a 35 Watt air-cooled $CO_2$ laser head integrated with an X-Y beam positioning system which can scan the beam over a 12"×24" work area. A 1.5" focusing lens is used to produce a laser spot size of 0.075" in the work plane. The unit is also equipped with a honeycomb work table. The desired graphics image is created in a drawing program such as AutoCad or Corel Draw. The laser system functions as a printer that accepts this data file then raster and/or vector scans the graphics image on the substrate using operator selected laser power settings.

LCDs from 2-5 substrates with individual thickness from 0.5-5.0 mil (12.5-125 microns) were simultaneously singulated and edge-sealed using the $CO_2$ laser. The laser power and speed settings are chosen so that sufficient plastic material is melted during the cut to form a weld between the substrates. For example, for the 2 mil thick, 5 substrate stack, a laser power of 28 Watts with a cutting speed of 25 inches per minute was used. In general, thinner substrates should use a lower power setting. However, it should also be noted that higher power settings can result in excess carbonation (burning) at the edges, a more rigid edge-seal, and a weaker weld. Examples of basic power settings are as follows:

TABLE 1

| Substrate | Total Thickness | % Power | % Speed | DPI |
| --- | --- | --- | --- | --- |
| 0.5 mil | 2.0 mil (4 substrates) | 40-50 | 25 | 1000 |
| 2 mil | 8 mil (4 substrates) | 75-90 | 25 | 1000 |
| 5 mil | 10 mil (2 substrates) | 75-90 | 25 | 1000 |
| 0.5 mil | 1 mil (2 substrates) | 30-40 | 25 | 1000 |
| 2 mil | 4 mil (2 substrates) | 50-60 | 25 | 1000 |

It is possible to add reinforcing cuts/welds in a discrete or non-continuous fashion on a ledge that cannot be cut flush, for example, between the conductive traces of a bonding ledge of a plastic LCD. Additional laser cut features have been demonstrated that provide strain relief to the bonding ledge during flexing of the plastic substrates. Also, rounded outside corners have been demonstrated that reduce stress concentrations and increase ruggedness of the welded joint. This process has been extended to include cutting and welding around through holes in plastic LCDs with multiple plastic sheets.

Consistent with the conventional understanding that only pure thermoplastic materials in contact with one another can be laser welded together due to contamination of the bond by impurities, we found that attempting to laser edge seal a PIPS-encapsulated plastic LCD using Polyethylene Terephthalate (PET) substrates with a linear weld, results in intermittent segments (e.g., on the order of 100 micrometers long) being welded or melted together, while large segments (e.g., on the order of millimeters) are not welded together. While not wanting to be bound by theory, it is our understanding that in the non-welded segments, the liquid crystal was not sufficiently heated to be ablated out of the weld area and remained as a residual that inhibited flow of the PET for melting the two substrates. In addition, we observed in the linear weld that the intermittent weld was quite strong perpendicular to the cut/weld-line direction but easily failed when sufficient force was applied at an oblique angle to the linear cut/weld-line.

The invention will now be described by way of the following, non-limiting examples.

Example 1

Single Layer Pixelated Display with ITO Conductor

Figure 2:
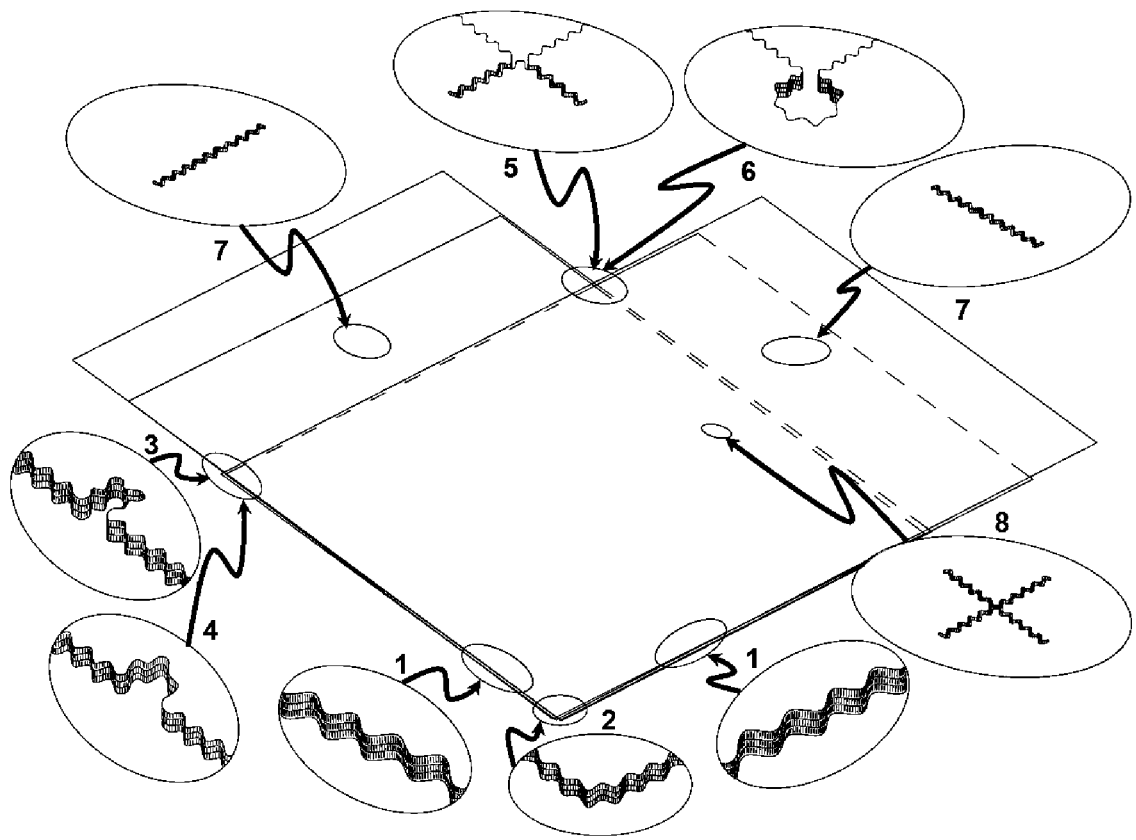
FIG. 2: A multi-layer pixelated display showing: edge seal, strain relief notches, ledge welding, inter-pixel welding, rounded corners, and strain relief inner corners.

An encapsulated liquid crystal layer using droplet dispersions by PIPS method was fabricated between two ITO-patterned 2 mil thick PET sheets (pixilated by rows and columns; FIG. 2). Solutions of an acrylate-based pre-polymer were vortex-mixed and then added to the cholesteric liquid crystal. Once this was vortex-mixed, 4.5 μm plastic spherical spacers were added to the mixture to preserve substrate spacing before polymerization. The system was mixed again via ultrasonic agitation (to suspend the spacers) and then pipetted between two PET substrates with conductive electrodes. The bead of liquid was then rolled down between the PET sheets using a hand roller and any excess was cleaned off. The material was polymerized under an Electro-lite ELC 4001 UV source as known in the art. During the curing process, the pre-polymer mixture polymerized, causing the liquid crystal to phase separate into droplets. After curing, an LCD was cut from the sheet using a $CO_2$ M-300 laser marking system built by Universal Laser Systems, Inc. (Scottsdale, Ariz.) by tracing the outline of the conductor at a spacing of 0.3 mm away from the conductor. The trace was sinusoidal in profile with an amplitude of 150 micrometers and a period of 280 micrometers. The laser was used at the following settings: approximately 18 watts power, 1000 dots per inch (DPI) and 25% of the maximum cutting speed of the machine.

During the singulation and edge-sealing [1], the display was also subjected to additional laser welding enhancements such as: strain relief notches [3], ledge welding [7], inter-pixel welding [8], rounded corners [2], and strain relief inner corners [5]. After singulation and bonding to electronics, the pixelated display was switchable, flexible, multiplexible, and rugged due to the edge-seal/laser welding mechanism.

Example 2

Multilayer Pixelated Display with ITO Conductor

Three encapsulated liquid crystal layers using droplet dispersions by PIPS method were fabricated between four ITO-patterned 2 mil thick PET sheets (pixelated by rows and columns; FIG. 2). Solutions of an acrylate-based pre-polymer were vortex-mixed and then added to the liquid crystal. Once the mixtures were vortex-mixed, 4 μm plastic spherical spacers were added to each mixture. The system was mixed again via ultrasonic agitation and then pipetted between two PET substrates with conductive electrodes. The bead of liquid was then rolled down between the PET sheets using a hand roller and any excess was cleaned off. Then each layer was individually laminated and polymerized under an Electro-lite ELC 4001 UV source. During the curing process, the pre-polymer mixture polymerized, causing the liquid crystal to phase separate into droplets. After curing, a three color LCD display was cut from the sheet using a $CO_2$ M-300 laser marking system built by Universal Laser Systems, Inc. (Scottsdale, Ariz.) by tracing the outline of the conductor at a spacing of 0.3 mm away from the conductor. The trace was sinusoidal in profile with an amplitude of 150 micrometers and a period of 280 micrometers. The laser had the following settings: approximately 27 watts power, 1000 DPI, and 25% cutting speed.

During the singulation and edge-sealing [1], the display was also subjected to additional laser welding enhancements such as: strain relief notches [3], ledge welding [7], inter-pixel welding [8], rounded corners [2], and strain relief inner corners [5]. After singulation and bonding to electronics, the pixelated three color display was switchable, flexible, multiplexible, and rugged due to the edge-seal/laser welding mechanism.

Example 3

Single Layer Segmented Display with ITO Conductor

An encapsulated LC layer using droplet dispersions by PIPS method was fabricated between two segmented (see FIG. 3) ITO-patterned 2 mil thick PET sheets. Solutions of an acrylate-based pre-polymer were vortex-mixed and then added to the liquid crystal. Once this was vortex-mixed, 4.5 μm plastic spherical spacers were added to the mixture. The system was mixed again via ultrasonic agitation (to suspend the spacers) and then pipetted between two PET substrates with conductive electrodes. The bead of liquid was then rolled down between the PET sheets using a hand roller and any excess was cleaned off. The material was polymerized under an Electro-lite ELC 4001 UV. During the curing process, the pre-polymer mixture polymerized, causing the liquid crystal to phase separate into droplets. After curing, an LCD was cut from the sheet using a $CO_2$ M-300 laser marking system built by Universal Laser Systems, Inc. (Scottsdale, Ariz.) by tracing the outline of the conductor at a spacing of 0.3 mm away from the conductor. The trace was sinusoidal in profile with an amplitude of 150 micrometers and a period of 280 micrometers. The laser had the following settings: approximately 18 watts power, 1000 DPI, and 25% cutting speed.

During the singulation and edge-sealing [9], the display was also subjected to additional laser welding enhancements such as; strain relief notches [13], ledge welding [7], cut outs [14], rounded corners [2], and strain relief inner corners [11]. After singulation and bonding to electronics, the segmented display was switchable, flexible, multiplexible, and rugged due to the edge-seal/laser welding mechanism.

Example 4

Multilayer Segmented Display with ITO Conductor

Figure 3:
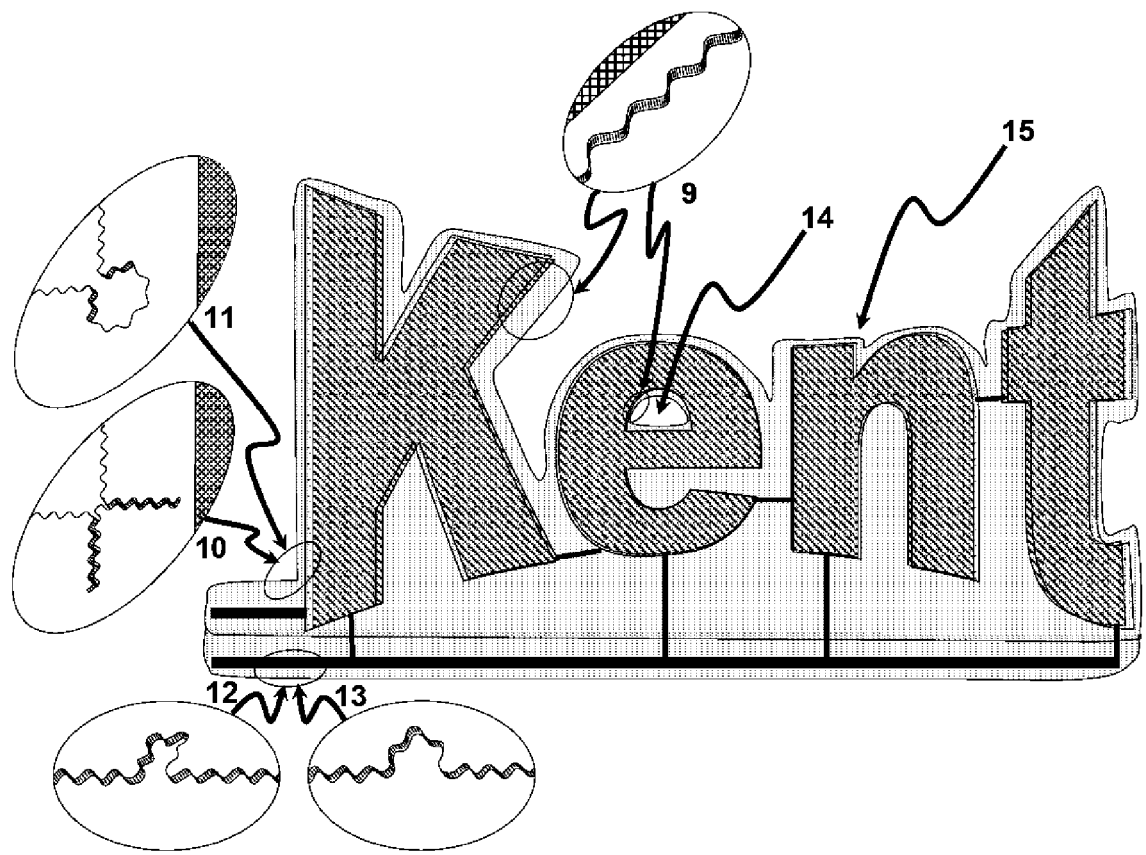
FIG. 3: A single-layer segmented display showing: edge seal, strain relief inner corners, strain relief notches, interior cut/edge seal in the display, and variable-shape exterior cut/edge seal.

Three encapsulated LC layers using droplet dispersions by PIPS method were fabricated between four segmented ITO-patterned 2 mil thick PET sheets (FIG. 3). Three mixtures of liquid crystal were made to obtain peak wavelengths of 465 nm (blue), 530 nm (green), and 645 nm (red). Solutions of an acrylate-based pre-polymer were vortex mixed and then added to the mixtures of liquid crystal. Once the mixtures were vortex-mixed, 4 μm plastic spherical spacers were added to each mixture. The system was mixed again via ultrasonic agitation and then pipetted between two PET substrates with conductive electrodes. The bead of liquid was then rolled down between the PET sheets using a hand roller and any excess was cleaned off. Then each layer was individually laminated and polymerized under an Electro-lite ELC 4001 UV source. During the curing process, the pre-polymer mixture polymerized, causing the liquid crystal to phase separate into droplets. After curing, a three color LCD display was cut from the sheet using a $CO_2$ M-300 laser marking system built by Universal Laser Systems, Inc. (Scottsdale, Ariz.) by tracing the outline of the conductor at a spacing of 0.3 mm away from the conductor. The trace was sinusoidal in profile with an amplitude of 150 micrometers and a period of 280 micrometers. The laser had the following settings: approximately 27 watts power, 1000 DPI, and 25% cutting speed.

During the singulation and edge-sealing [9], the display was also subjected to additional laser welding enhancements such as; strain relief notches [13], ledge welding [7], cut outs [14], rounded corners [2], and strain relief inner corners [11]. After singulation and bonding to electronics, the segmented three color display was switchable, flexible, multiplexible, and rugged due to the edge-seal/laser welding mechanism.

Example 5

Single Layer Pixelated Display with Conductive Polymer

An encapsulated LC layer using droplet dispersions by PIPS method was fabricated between two conductive polymer-patterned 0.5 mil thick PET sheets (pixelated by rows and columns; FIG. 2). Solutions of an acrylate-based pre-polymer were vortex-mixed and then added to the liquid crystal. Once this was vortex-mixed, 4.5 μm plastic spherical spacers were added to the mixture. The system was mixed again via ultrasonic agitation and then pipetted between two PET substrates with conductive electrodes. The bead of liquid was then rolled down between the PET sheets using a hand roller and any excess was cleaned off. The material was polymerized under an Electro-lite ELC 4001 UV source. During the curing process, the pre-polymer mixture polymerized causing the liquid crystal to phase separate into droplets. After curing, an LCD was cut from the sheet using the $CO_2$ M-300 laser marking system built by Universal Laser Systems, Inc. (Scottsdale, Ariz.) by tracing the outline of the conductor at a spacing of 0.3 mm away from the conductor. The trace was sinusoidal in profile with an amplitude of 150 micrometers and a period of 280 micrometers. The laser had the following settings: approximately 11 watts power, 1000 DPI, and 25% cutting speed.

During the singulation and edge-sealing [1], the display was also subjected to additional laser welding enhancements such as; strain relief notches [3], ledge welding [7], inter-pixel welding [8], rounded corners [2], and strain relief inner corners [5]. After singulation and bonding to electronics, the pixelated display was switchable, flexible, multiplexible, and rugged due to the edge-seal/laser welding mechanism.

Example 6

Multilayer Pixelated Display with Conductive Polymer

Three encapsulated LC layers using droplet dispersions by PIPS method were fabricated between four conductive polymer-patterned 0.5 mil thick PET sheets (pixilated by rows and columns; FIG. 2). Three mixtures of liquid crystal were made to obtain peak wavelengths of 465 nm (blue), 530 nm (green), and 465 nm (red). Solutions of an acrylate-based pre-polymer were vortex-mixed and then added to the mixtures of liquid crystal. Once the mixtures were vortex-mixed, 4 µm plastic spherical spacers were added to each mixture. The system was mixed again via ultrasonic agitation and then pipetted between two PET substrates with conductive electrodes. The bead of liquid was then rolled down between the PET sheets using a hand roller and any excess was cleaned off. Then each layer was individually laminated and polymerized under an Electro-lite ELC 4001 UV source. During the curing process, the pre-polymer mixture polymerized, causing the liquid crystal to phase separate into droplets. After curing, a three color LCD display was cut from the sheet using a $CO_2$ M-300 laser marking system built by Universal Laser Systems, Inc (Scottsdale, Ariz.) by tracing the outline of the conductor at a spacing of 0.3 mm away from the conductor. The trace was sinusoidal in profile with an amplitude of 150 micrometers and a period of 280 micrometers. The laser had the following settings: approximately 15 watts power, 1000 DPI, and 25% cutting speed.

During the singulation and edge-sealing [1], the display was also subjected to additional laser welding enhancements such as; strain relief notches [3], ledge welding [7], interpixel welding [8], rounded corners [2], and strain relief inner corners [5]. After singulation and bonding to electronics, the pixilated three color display was switchable, flexible, multiplexible, and rugged due to the edge-seal/laser welding mechanism.

Example 7

Single Layer Segmented Display with Conductive Polymer

An encapsulated LC layer using droplet dispersions by PIPS method was fabricated between two conductive polymer-patterned 2 mil thick PET sheets (segmented; FIG. 3). Solutions of an acrylate-based pre-polymer were vortex-mixed and then added to the liquid crystal. Once this was vortex-mixed, 4.5 µm plastic spherical spacers were added to the mixture. The system was mixed again via ultrasonic agitation and then pipetted between two PET substrates with conductive electrodes. The bead of liquid was then rolled down between the PET sheets using a hand roller and any excess was cleaned off. The material was polymerized under an Electro-lite ELC 4001 UV source at an intensity of 1.0 $mW/cm^2$ for approximately 15 minutes. During the curing process, the pre-polymer mixture polymerized, causing the liquid crystal to phase separate into droplets. After curing, an LCD was cut from the sheet using the $CO_2$ M-300 laser marking system built by Universal Laser Systems, Inc. (Scottsdale, Ariz.) by tracing the outline of the conductor at a spacing of 0.3 mm away from the conductor. The trace was sinusoidal in profile with an amplitude of 150 micrometers and a period of 280 micrometers. The laser had the following settings: approximately 18 watts power, 1000 DPI, and 25% cutting speed.

During the singulation and edge-sealing [9], the display was also subjected to additional laser welding enhancements such as; strain relief notches [13], ledge welding [7], cut outs [14], rounded corners [2], and strain relief inner corners [11]. After singulation and bonding to electronics, the single layer segmented display was switchable, flexible, multiplexible, and rugged due to the edge-seal/laser welding mechanism.

Example 8

Multilayer Segmented Display with Conductive Polymer

Three encapsulated LC layers using droplet dispersions by PIPS method were fabricated between four segmented conductive polymer-patterned 0.5 mil thick PET sheets (FIG. 3). Three mixtures of liquid crystal were made to obtain peak wavelengths of 465 nm (blue), 530 nm (green), and 645 nm (red). Solutions of an acrylate-based pre-polymer were vortex mixed and then added to the mixtures of liquid crystal. Once the mixtures were vortex-mixed, 4 µm plastic spherical spacers were added to each mixture. The system was mixed again via ultrasonic agitation and then pipetted between two PET substrates with conductive electrodes. The bead of liquid was then rolled down between the PET sheets using a hand roller and any excess was cleaned off. Then each layer was individually laminated and polymerized under an Electro-lite ELC 4001 UV source. During the curing process, the pre-polymer mixture polymerized, causing the liquid crystal to phase separate into droplets. After curing, a three color LCD display was cut from the sheet using the $CO_2$ M-300 laser marking system built by Universal Laser Systems, Inc. (Scottsdale, Ariz.) by tracing the outline of the conductor at a spacing of 0.3 mm away from the conductor. The trace was sinusoidal in profile with amplitude of 150 micrometers and a period of 280 micrometers. The laser had the following settings: approximately 15 watts power, 1000 DPI, and 25% cutting speed.

During the singulation and edge-sealing [9], the display was also subjected to additional laser welding enhancements such as; strain relief notches [13], ledge welding [7], cut outs [14], rounded corners [2], and strain relief inner corners [11]. After singulation and bonding to electronics, the multilayer, segmented three color display was switchable, flexible, multiplexible, and rugged due to the edge-seal/laser welding mechanism.

Example 9

Single Layer Segmented Display Laser-Singulating Through Conductive Polymer An encapsulated LC layer using droplet dispersions by PIPS method was fabricated between two conductive polymer-patterned 2 mil thick PET sheets (segmented; FIG. 3). Solutions of an acrylate-based pre-polymer were vortex-mixed and then added to the liquid crystal. Once this was vortex-mixed, 4.5 µm plastic spherical spacers were added to the mixture. The system was mixed again via ultrasound agitation and then pipetted between two PET substrates with conductive electrodes. The bead of liquid was then rolled down between the PET sheets using a hand roller and any excess was cleaned off. The material was polymerized under an Electro-lite ELC 4001 UV source. During the curing process, the pre-polymer mixture polymerized, causing the liquid crystal to phase separate into droplets. After curing, an LCD was cut from the sheet using the CO2 M-300 laser marking system built by Universal laser Systems. Inc. (Scottsdale, Ariz.) by tracing the outline through the conductor. The trace was sinusoidal in profile with an amplitude of 150 micrometers and a period of 280 micrometers. The trace defined the outside shape of the pixel by cutting through the conductor. The laser had the following settings: approximately 18 watts power, 1000 DPI and 25% cutting speed.

During singulation and edge-sealing [9], the display was also subjected to additional laser welding enhancements such as: strain relief notches [13], ledge welding [7], cut outs [14], rounded corners [2], and strain relief inner corners [11]. After singulation, the single laser segmented display was burned in by electronic switching to eliminate any top-to-bottom shorts from the top-plane conductor to the bottom-plane conductor. After burn-in, the display was bonded to the electronics and was switchable, flexible, multiplexible, and rugged due to the edge-seal/laser welding mechanism.

Example 10

Multilayer Segmented Display Laser-Singulating Through Conductive Polymer

Three encapsulated LC layers using droplet dispersions by PIPS method were fabricated between four segmented conductive polymer-patterned 0.5 mil thick PET sheets (FIG. 3). Three mixtures of liquid crystal were made to obtain peak wavelengths of 465 nm (blue), 530 nm (green), and 645 nm (red). Solutions of an acrylate-based pre-polymer were vortex-mixed and then added to the mixtures of liquid crystal. Once the mixtures were vortexed-mixed, 4 μm plastic spherical spacers were added to each mixture. The system was mixed again via ultrasonic agitation and then pipetted between two PET substrates with conductive electrodes. The bead of liquid was then rolled down between the PET sheets using a hand roller and any excess was cleaned off. Then each layer was individually laminated and polymerized under an Electro-lite ELC 4001 UV source. During the curing process, the pre-polymer mixture polymerized, causing the liquid crystal to phase separate into droplets. After curing, a three color LCD display was cut from the sheet using the CO2 M-300 laser marking system built by Universal Laser Systems, Inc. (Scottsdale, Ariz.) by tracing a shape through the conductor. The trace was sinusoidal in profile with amplitude of 150 micrometers and a period of 280 micrometers. The trace defined the outside shape of the pixelated display by cutting through the conductor. The laser had the following settings: approximately 15 watts power, 1000 DPI, and 25% cutting speed.

During the singulation and edge-sealing [9], the display was also subjected to additional laser welding enhancements such as: strain relief notches [13], ledge welding [7], cut outs [14], rounded corners [2] and strain relief inner corners [11]. After singulation, the single layer segmented display was burned in by electronic switching to eliminate any top-to-bottom shorts from the top-plane conductor to the bottom-plane conductor. After burn-in, the display was bonded to the electronics and was switchable, flexible, multiplexible, and rugged due to the edge-seal/laser welding mechanism.

Example 11

Single Layer Display with Conductive Polymer

An encapsulated LC layer using droplet dispersions by PIPS method was fabricated between two 0.5 mil or 2 mil thick PET sheets that were continuously coated with conductive polymer. Solutions of an acrylate-based pre-polymer were added to the liquid crystal and then vortex mixed. Once this was vortex mixed, 4.0 μm plastic spherical spacers were added to the mixture. The system was mixed again via ultrasonic agitation and then pipetted between the two PET substrates with conductive electrodes. The bead of liquid was then rolled down between the PET sheets using a hand roller and any excess was cleaned off. The material was polymerized under an Electro-lite ELC 4001 UV source at an intensity of approximately 1.0 mW/cm$^2$ for approximately 15 minutes. During the curing process, the pre-polymer mixture polymerized causing the liquid crystal to phase separate into droplets. After curing, an LCD was cut from the sheet using the CO$_2$ M-300 laser marking system built by Universal Laser Systems, Inc. (Scottsdale, Ariz.). The laser cut was sinusoidal in profile with an amplitude of 150 μm and a period of 280 μm. The laser had the following settings: approximately 12 watts power, 1000 DPI, and 0.9% cutting speed. The resulting LCD is a single switchable pixel with any desired shaped perimeter (square, rectangular, round or abstract).

During the singulation and edge sealing [1], the display was also subjected to additional laser welding enhancements such as: strain relief notches [3], laser welding [7], inter-pixel welding [8], rounded corners [2], and strain relief inner corners [5]. After singulation and bonding to electronics, the display was switchable, flexible, multiplexible, and rugged due to the edge-seal/laser welding mechanism.

Example 12

Multilayer Display with Conductive Polymer

Three encapsulated LC layers were fabricated between 0.5 mil thick PET sheets that were continuously coated with conductive polymer using droplet dispersions by the PIPs method. Solutions of an acrylate-based pre-polymer were vortex mixed and then added to the liquid crystal mixture. The three mixtures had peak wavelengths of 465 nm (blue), 530 nm (green) and 645 nm (red). Once the mixtures were vortex-mixed, 4 μm plastic spherical spacers were added to each mixture. The system was mixed again via ultrasonic agitation and then pipetted between two PET substrates with conductive electrodes. The bead of liquid was then rolled down between the PET sheets using a hand roller and any excess was cleaned off. Then each layer was individually laminated and polymerized under an Electro-lite ELC 4001 UV source at an intensity of 1.0 mW/cm$^2$ for approximately 15 minutes. During the curing process, the pre-polymer mixture polymerized, causing the liquid crystal to phase separate into droplets. After curing, a three color LCD display was cut from the sheet using a CO$_2$ M-300 laser marking system built by Universal Laser Systems, Inc. (Scottsdale, Ariz.). The laser cut was sinusoidal in profile with an amplitude of 150 μm and a period of 280 μm. The laser had the following settings: approximately 12 watts power, 1000 DPI, and 0.9% cutting speed. The resulting LCD is a 3-layer RGB-switchable pixel with any desired shaped perimeter (square, rectangular, round or abstract).

During the singulation and edge sealing [1], the display was also subjected to additional laser welding enhancements such as: strain relief notches [3], laser welding [7], inter-pixel welding [8], rounded corners [2], and strain relief inner corners [5]. After singulation and bonding to electronics, the pixelated three color display was switchable, flexible, multiplexible, and rugged due to the edge-seal/laser welding mechanism.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A method of fabricating a display comprising:
stacking a layer of display media and at least two layers of thermoplastic polymer, said display layer being disposed between said polymer layers; and
simultaneously cutting and welding said polymer layers in a presence of said display media as a contaminant to a bond between said polymer layers using a laser beam by continuously moving said laser beam in a first direction within a plane of said layers and in a second direction transverse to said first direction within said plane, thereby forming a cut pattern,
wherein said cut pattern has an amplitude in said second direction that ranges from 20 to 500 micrometers and a period in said first direction that ranges from 50 to 1000 micrometers,
wherein said cut and welded polymer layers formed in said cut pattern enable said display to avoid delamination when subjected to forces propagated in various directions.

2. A method of fabricating a display comprising:
stacking a layer of display media and at least two layers of thermoplastic polymer, said display layer being disposed between said polymer layers; and
simultaneously cutting and welding said polymer layers in a presence of said display media as a contaminant to a bond between said polymer layers using a laser beam by continuously moving said laser beam in a first direction within a plane of said layers and in a second direction transverse to said first direction within said plane, thereby forming a cut pattern,
wherein said cut pattern has a shape selected from the group consisting of sinusoidal, saw-tooth, square wave and combinations thereof,
wherein said cut and welded polymer layers formed in said cut pattern enable said display to avoid delamination when subjected to forces propagated in various directions.

3. The method of claim 1 further comprising cutting said layers in said first direction without movement in said second direction.

4. The method of claim 1 further comprising stacking first and second electrically conductive layers so as to flank said display layer.

5. The method of claim 4 wherein said display media is cholesteric liquid crystal material.

6. The method of claim 4 wherein said display media is selected from the group consisting of liquid crystal material, electrophoretic material, microcups containing liquid crystal material, microcups containing electrophoretic material, twisted nematic liquid crystal material, and super twisted nematic liquid crystal material.

7. The method of claim 4 wherein said polymer layer and said first electrically conductive layer comprise an active matrix backplane.

8. The method of claim 4 wherein said first electrically conductive layer comprises a plurality of first electrode lines and said second electrically conductive layer includes a plurality of second electrode lines extending orthogonal to said first electrode lines.

9. The method of claim 4 wherein said display media includes cholesteric liquid crystal material, comprising a number of said display layers n disposed between said polymer layers, where $n \geq 2$.

10. The method of claim 4 wherein said display media includes cholesteric liquid crystal material reflective of at least two different colors in said display layer.

11. The method of claim 1 wherein said thermoplastic polymer comprises a polymer selected from the group consisting of: polycarbonate (PC), polyethylene terephthalate (PET), PC/PET blends, polyethylene naphthalate (PEN), polyester, polyvinyl chloride, polypropylene cellulose acetate, ethylene-vinyl acetate, triacetyl cellulose (TAC), polybutylene terephthalate, polytetrafluoroethylene, polyvinyl fluoride, polyvinylidene fluoride, perfluoroalkoxy tetrafluoroethylene, polychloro trifluoroethylene, polyamides, polyimides, polyamideimide, polyetherimides, polyoxymethylene, polyphenylene oxide, polyaryletherketones, polysulphones, polyphenylene sulfide and combinations thereof.

12. The method of claim 4 wherein said electrically conductive layers comprise indium tin oxide or indium zinc oxide.

13. The method of claim 4 wherein said electrically conductive layers comprise carbon nanotubes or conductive polymer.

14. The method of claim 4 comprising repairing an electrical short by tracing the cut pattern with a laser and burning away the electrical short.

15. The method of claim 4 comprising repairing an electrical short by burning away the electrical short with electronic switching of the display.

16. The method of claim 1 wherein said cut pattern forms notches that provide strain relief to said display.

17. The method of claim 8 wherein pixels are formed at regions of intersection of said first electrode lines and said second electrode lines, and said polymer layers are welded together at said cut pattern located between said pixels.

18. The method of claim 8 wherein said polymer layers are welded together at said cut pattern located between adjacent said first lines or adjacent said second lines.

19. The method of claim 1 wherein said cut pattern forms a hole in said polymer layers.

20. The method of claim 1 wherein a roll comprises said layers of said display media and said thermoplastic polymer, comprising unwinding said roll and carrying out said step of cutting said polymer layers to form said cut pattern repeatedly so as to cut a plurality of said displays from said unwound roll.

21. The method of claim 1 wherein a large sheet comprises said layers of said display media and said thermoplastic polymer, comprising carrying out said step of cutting said polymer layers to form said cut pattern repeatedly so as to cut a plurality of said displays from said large sheet.

22. The method of claim 1 wherein said display media comprises liquid crystal, and said cutting of said layers occurs in a presence of said liquid crystal as the contaminant to the bond between said polymer layers.

23. The method of claim 22 wherein said liquid crystal includes droplets of the liquid crystal dispersed in a polymer matrix.

24. A method of fabricating liquid crystal displays comprising:
a) forming a roll by stacking at least one liquid crystal layer including liquid crystal droplets in polymer, electrically conductive layers and at least two layers of thermoplastic polymer, said liquid crystal layer and said electrically conductive layers being disposed between said polymer layers and said electrically conductive layers flanking each said liquid crystal layer;

b) unwinding said roll; and c) simultaneously cutting through and welding together said polymer layers of said roll using a laser beam to trace an outline of a liquid crystal display, wherein said cutting and welding occurs by continuously moving said laser beam in a first direction within a plane of said layers and in a second direction transverse to said first direction within said plane thereby forming a wave cut pattern around said display, said cut pattern having an amplitude in said second direction that ranges from 20 to 500 micrometers and a period in said first direction that ranges from 50 to 1000 micrometers, wherein said polymer layers are simultaneously cut and welded together in forming said cut pattern in a presence of said liquid crystal as a contaminant to a bond between said polymer layers, wherein said step c) is carried out repeatedly so as to cut a plurality of said displays from said unwound roll, wherein said cut and welded polymer layers formed in said cut pattern enable said display to avoid delamination when subjected to forces propagated in various directions.

25. The method of claim 24 wherein said liquid crystal includes cholesteric liquid crystal, comprising a number of said liquid crystal layers n disposed between said polymer layers, where n≧2.

26. A method of fabricating liquid crystal displays comprising:

a) forming a roll by stacking at least one liquid crystal layer including liquid crystal droplets in polymer, electrode layers made of conductive polymer, and at least two layers of thermoplastic polymer, said liquid crystal layer and said electrode layers being disposed between said polymer layers and said electrode layers flanking each said liquid crystal layer;

b) unwinding said roll; and c) simultaneously cutting through said polymer and electrode layers of said roll and welding said polymer layers together using a laser beam to trace an outline of a liquid crystal display, wherein said cutting and welding occurs by continuously moving said laser beam in a first direction within a plane of said layers and in a second direction transverse to said first direction within said plane thereby forming a wave cut pattern around said display, said cut pattern having an amplitude in said second direction that ranges from 20 to 500 micrometers and a period in said first direction that ranges from 50 to 1000 micrometers, wherein said polymer layers are simultaneously cut and welded together in forming said cut pattern in a presence of said liquid crystal as a contaminant to a bond between said polymer layers, wherein said step c) is carried out repeatedly so as to cut a plurality of said displays from said unwound roll, wherein said cut and welded polymer layers formed in said cut pattern enable said display to avoid delamination when subjected to forces propagated in various directions.

27. The method of claim 26 wherein said liquid crystal includes cholesteric liquid crystal, comprising a number of said liquid crystal layers n disposed between said polymer layers, where n≧2.

* * * * *